June 13, 1961 J. M. HELKA 2,987,962
REMOTELY CONTROLLED MIRROR
Filed Sept. 30, 1957 2 Sheets-Sheet 1

INVENTOR.
James M. Helka
BY R. F. Bernard
ATTORNEY

June 13, 1961 J. M. HELKA 2,987,962
REMOTELY CONTROLLED MIRROR
Filed Sept. 30, 1957 2 Sheets-Sheet 2

INVENTOR.
James M. Helka
BY
R. F. Barnard
ATTORNEY

United States Patent Office 2,987,962
Patented June 13, 1961

2,987,962
REMOTELY CONTROLLED MIRROR
James M. Helka, St. Clair Shores, Mich., assignor to General Motors Corporation, Detroit, Mich., a corporation of Delaware
Filed Sept. 30, 1957, Ser. No. 687,032
4 Claims. (Cl. 88—93)

The present invention relates to rear view mirrors and, more particularly, to mirrors which are especially adapted to be mounted on an exterior portion of an automotive vehicle body panel while being capable of remote control from within the vehicle passenger compartment.

It has long been considered advantageous to provide a mounting for a mirror and control means therefor whereby the mirror may be accurately positioned remotely. The advantages of such a construction are particularly apparent where a rear view mirror is to be mounted exteriorly of a vehicle on a body panel thereof, while suitable manually operable control means are provided within the vehicle passenger compartment whereby the vehicle operator may conveniently position the mirror as desired without directly manually grasping the mirror. The convenience and facility of adjustment of such a mechanism from within the interior of the vehicle will be readily apparent.

In the past, the relatively common approach to such a construction has been to provide a mirror assembly including a spherical ball joint on which the mirror may be mounted, and about which the mirror may be universally positioned by actuating some remotely located control member. While such constructions do provide the desired function, they are somewhat costly and necessitate rather minute manipulation and manual dexterity on the part of the vehicle operator to remotely position the mirror to fit his particular needs.

It is, therefore, a principal object and feature of this invention to provide a remotely controllable mirror construction which may be relatively easily and simply fabricated of inexpensive materials as compared to those known in prior art.

More particularly, it is an object and feature of this invention to provide a remotely controlled mirror construction in which the mirror may be positioned merely by rotating a control member in a single plane.

It is still another object of this invention to provide a remotely controlled mirror assembly comprising a mirror support including a cam track operatively supporting a rotatable mirror whereby upon rotation of the mirror the latter will be rotated in a predetermined path about the aforementioned cam track.

In general, these and other objects of this invention are attained by providing a substantially cylindrical or cup-shaped mirror support which has formed thereon a circumferentially extending cam track disposed in a curved or arcuate path, and adapted to receive cam followers operatively associated with the mirror, and remotely operable means drivingly connected to the mirror for rotating the latter, whereby the mirror will be wobbled or oscillated in a predetermined path within the mirror housing.

These and other features, objects and advantages of this invention will appear more fully hereinafter as the description of the invention proceeds, and in which reference is made to the following drawings in which.

Figure 1:
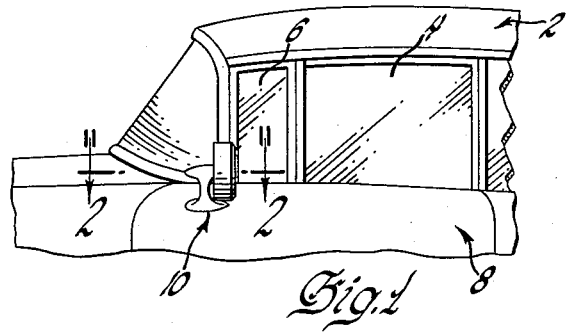
FIGURE 1 is a fragmentary side elevational view of the automotive vehicle having mounted exteriorly thereof the mirror assembly of this invention.

In FIGURE 1, there is shown an automotive vehicle 2 having a side window 4 and ventilation window 6 mounted in the usual manner on a front door panel 8. A mirror assembly, indicated generally at 10, is secured to the door panel 8. However, as will be more fully appreciated hereinafter, the mirror assembly 10 also may be mounted on other portions of the vehicle such as the fenders.

Figure 2:
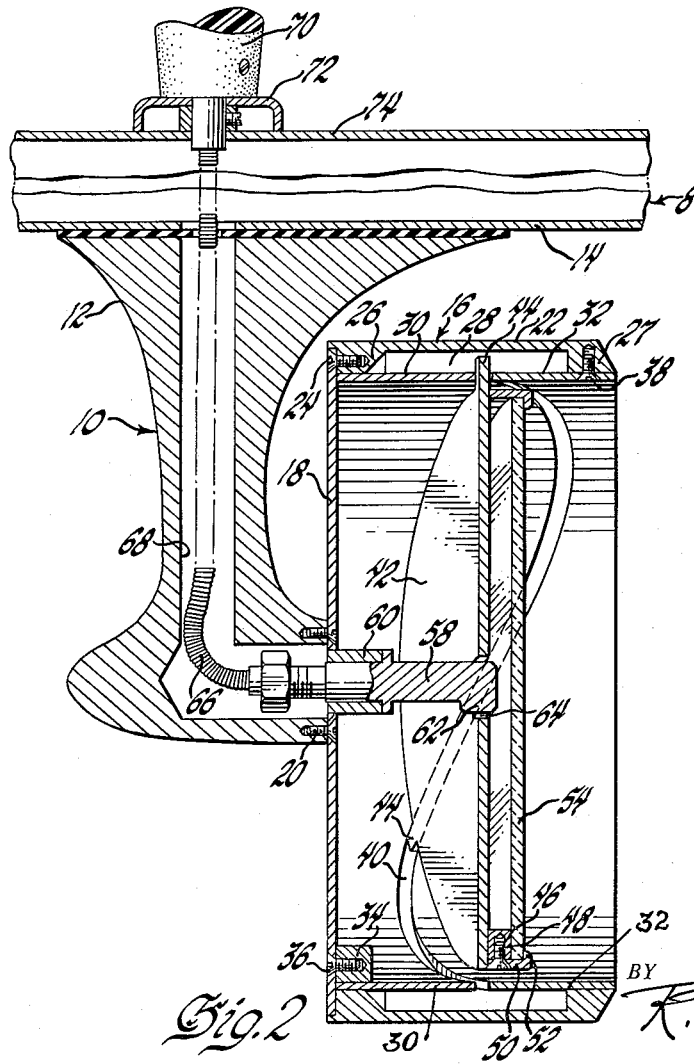
FIGURE 2 is a cross-sectional view taken on line 2—2 of FIGURE 1.
Figure 3:
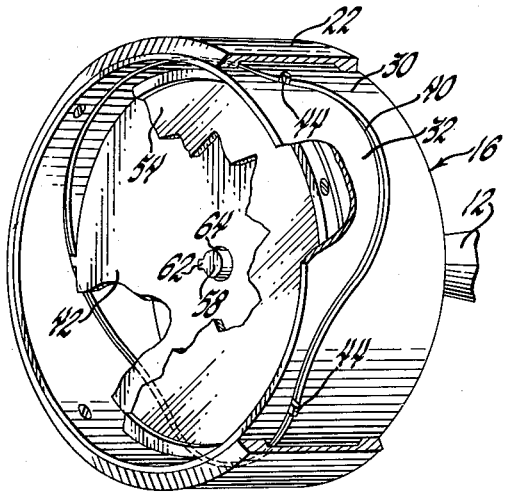
FIGURE 3 is a perspective view, partly broken away, of the mirror shown in FIGURE 2.

Referring now to FIGS. 2 and 3 in particularly, the mirror assembly 10 may be seen to include a suitably shaped bracket 12 bolted or otherwise secured to the exterior wall 14 of the front door panel 8. A cup shaped mirror body or housing 16 includes a thin circular back plate 18 suitably secured to the extreme end of the bracket 12 by threaded fasteners such as are shown at 20. A cylindrical axially extending bezel or housing side wall 22 is suitably secured to the back plate 18, such as by a plurality of spaced threaded fasteners 24. At either of its ends, the bezel member 22 is provided with annular radially inwardly directed ribs 26, 27 or a suitable number of spaced projections, which form therebetween an annular cavity 28 for a purpose to appear more fully hereinafter.

A pair of coaxial cam cylinders 30 and 32, respectively, are adapted to be secured against the annular ribs 26, 27  To this end, the cam cylinder 30 is provided with a suitable number of circumferentially spaced tapping blocks 34 which abut the forward face of the back plate 18 to receive suitable threaded fasteners 36, while the cam cylinder 32 includes a suitable number of threaded fasteners 38 which secure it in a fixed relation to the bezel member 22.

Figure 6:
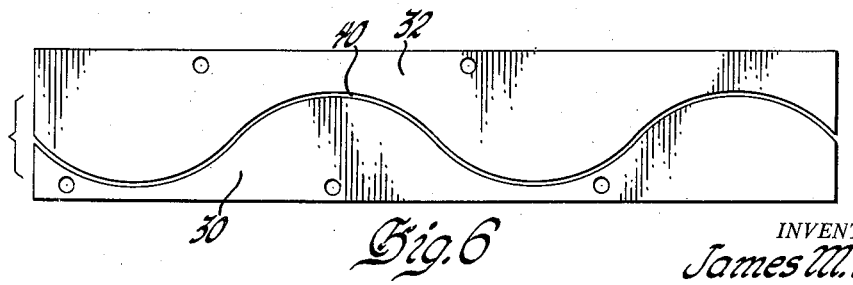
FIGURE 6 is a developed view of the cam track associated with the mirror to dispose the latter in a predetermined position under control of the operator.

With reference to FIG. 6 particularly, it may be seen that the opposed adjacent ends of each of the cam cylinders 30 and 32 are spaced slightly from each other and are curved in a substantially sinusoidal path. Thus, these opposed ends of the cam cylinders define a cam track 40 forming a predetermined curved path extending circumferentially about the cylindrical side wall of the mirror housing. Moreover, it will be noted that the arcuate path of the track is defined by any given point thereon continuously shifting axially relative to the mirror housing back plate 18 as it travels about the track.

A circular mounting plate 42 has its peripheral edge slightly radially inwardly spaced from the inner surfaces of the aforementioned cam cylinders 30 and 32, and includes a plurality of radially outwardly spaced projections 44 forming followers extending through the cam track 40 into the annular chamber 28. On its forward face, the mounting plate is provided with any desired number of circumferentially spaced tapping blocks 46 adapted to receive threaded fasteners 48 to retain fixed thereto a door or retaining ring 50 having a shoulder 52 thereon retaining the mirror 54 in abutment with the blocks 46 and rigidly secured to the mounting plate for movement therewith. It will also be appreciated that the entire mirror assembly is disposed on the vehicle so that the mirror 54 is viewable through the mirror housing opening by the vehicle operator through one or more of the vehicle side windows.

A mirror positioning or control rod 58 is rotatably journalled in a suitable bushing 60 secured to the back plate 18, and extends forwardly into the interior of the housing 16 substantially coaxially with the aforementioned cam cylinders. At its foremost end, the control rod is provided with a radially projecting key 62. The keyed end of the control rod is adapted for engagement with a similarly contoured opening 64 in the center of the mounting plate 42. From FIGS. 2 and 32, in particular, it will be noted that this keyed connection is a relatively loose fit while providing rotative driving engagement between the rotatable control arm or rod 58 and the mounting plate 42.

One suitable means for imparting rotation to the control arm 58 is shown in FIG. 2, and comprises a flexible cable 66 which extends through a bore 68 in the bracket 12 to operatively rotatably connect the control rod 58 to a manually operable knob or handle 70 suitably secured on a bracket 72 disposed on an inner panel 74 of the vehicle body panel 8.

Figure 4:
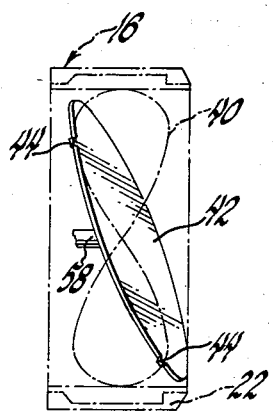
FIGURES 4 and 5 are schematic representations of the mirror in two different adjusted positions.
Figure 5:
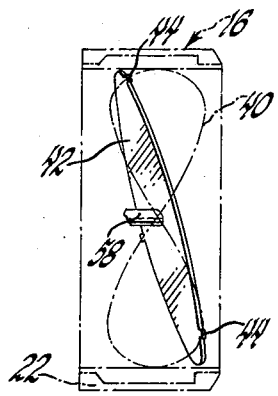

From the foregoing description, it will now be obvious that, in operation, manual rotation of control knob or lever 70 in a single plane will impart rotation to the control rod 58 which is rotatably drivingly connected to the mounting plate 42 which supports the mirror. As a result, the mounting plate will be rotated relative to the cam track 40 and, due to the cam follower means 44, will be moved or oscillated within predetermined fixed limits in an arcuate path. While the keyed connection between the control rod 58 and the mounting plate 42 rotatably drives the mounting plate, it also permits the latter to wobble about the longitudinal axis of the control rod due to its loose fit, thereby accommodating the wobbling movement induced by the curvature of the cam track. Thus, in looking toward the mirror in FIG. 4, sufficient rotation of the control rod in a counterclockwise direction will rotate the cam followers within the cam track to dispose the mirror in the position shown in FIG. 5.

Although the mirror housing 16 has been disclosed as being rigidly secured to the bracket 12 as by the fasteners 20, it will be readily apparent that this connection may be made adjustable if desired to increase the range of adjustment of the mirror. However, in most instances, the curvature of the cam track 40 may be selected to provide a range of mirror adjustment to fit all circumstances. In this regard, it should be noted that the curvature of the cam track 40 is not limited to that specifically shown, nor need it necessarily be continuous in nature although the latter is obviously preferable. All that is required is that the cam track have a curvature which will provide the predetermined path of mirror adjustment required under any given circumstances.

From the foregoing description, it will be apparent that the novel mirror assembly of this invention is comprised of relatively simple and inexpensively manufactured parts inasmuch as they are primarily planar members which may be formed from stampings. Even the cam cylinder elements may be easily mass produced as stampings and predetermined lengths thereof formed into a cylindrical unit with their terminal ends suitably secured together. Apart from these considerations, it will be noted that the assembly of this invention completely avoids the use of expensive elements such as ball joints for mounting the mirror on its support and, moreover, provides a cam track which will give a predetermined path of mirror adjustment merely by rotating the control knob or handle 70. Thus, the vehicle operator is not distracted from his driving efforts by being required to impart movements to the control knob 70 other than simple rotational movement in a single plane. In other words, where prior known constructions might also require imparting reciprocating movement to the control cable 66 to effect universal adjustment of the mirror assembly about the commonly used ball joint, the mirror assembly of this invention includes a novel cam track which in and of itself effects positioning of the mirror upon simple rotation of the control knob.

Having shown but one embodiment of the invention for illustrative purposes only, it is to be understood that such disclosure is not in any way intended to limit the scope of the invention which is defined by the claims which follow.

I claim:

1. A remotely controlled mirror assembly comprising a housing having a mirror receiving cavity therein, a cam track formed on and fixed relative to said housing within said cavity, said cam track comprising a non-planar curve, a mirror control arm rotatably disposed in said housing cavity, a mounting plate within said cavity, means for drivingly connecting said rotatable arm to said mounting plate, said connecting means including means for permitting said mounting plate to wobble relative to said control arm as the latter is rotated, cam follower means secured to said plate and riding in said cam track, a mirror mounted on said mounting plate, and remotely actuable means operably connected to said control arm to rotate the latter.

2. A remotely controlled mirror assembly comprising a housing having an axially extending substantially cylindrical side wall, a cam track formed in said side wall, said cam track being in the shape of a substantially sinusoidal curve disposed circumferentially about the inner surface of said side wall, a rotatable control arm mounted on said housing, a mounting plate disposable within said housing with its peripheral edge radially inwardly spaced from said housing side wall, spaced cam follower means formed on the periphery of said mounting plate and projecting into said cam track, a mirror secured on said mounting plate on the side thereof toward said housing opening, means for rotatably drivingly connecting said mounting plate to said control arm, said connecting means permitting said mounting plate to wobble about the axis of said control arm as the latter is rotated, and remotely actuable means operatively connected to said control arm to rotate the latter.

3. A remotely controlled mirror assembly comprising a housing having an opening at one end thereof, a pair of coaxial cam cylinders secured within said housing, the adjacent ends of said cam cylinders being curved to form a cam track which varies in distance from said housing opening, a control arm projecting into said housing substantially coaxially with said cam cylinders, a mounting plate, a key connection between said mounting plate and control arm loosely supporting the former on the latter, said key connection permitting relative wobbling movement between said mounting plate and control arm, a plurality of spaced cam follower means formed on said mounting plate and projecting into said cam track, a mirror secured on said mounting plate toward said housing opening, and remotely actuable operating means operatively connected to said control arm to rotate the latter.

4. A remotely controlled mirror assembly comprising a housing having a mirror receiving cavity therein, a cam track formed on and fixed relative to said housing, said cam track comprising a non-planar curve, a mounting plate supported on said housing within said cavity for rotation relative to said housing, cam follower means secured to said mounting plate and riding in said cam track, a mirror mounted on said mounting plate, a remotely located actuator, and means drivingly connecting said actuator to said mounting plate to rotate the latter relative to said housing, said last-named means including a portion adjacent said mounting plate permitting said mounting plate to wobble relative to said housing as said mounting plate is rotated.

(References on following page)

References Cited in the file of this patent

UNITED STATES PATENTS

| | | |
|---|---|---|
| 1,844,675 | Oishei et al. | Feb. 9, 1932 |
| 1,950,166 | Durholz | Mar. 6, 1934 |
| 2,052,770 | Hofer | Sept. 1, 1936 |
| 2,085,000 | Borba et al. | June 29, 1937 |
| 2,456,362 | Aves | Dec. 14, 1948 |
| 2,457,348 | Chambers | Dec. 28, 1948 |
| 2,664,029 | Higgins | Dec. 29, 1953 |
| 2,696,142 | Langford | Dec. 7, 1954 |
| 2,724,995 | Matner | Nov. 29, 1955 |
| 2,791,939 | Malachowski | May 14, 1957 |
| 2,855,825 | Feder | Oct. 14, 1958 |
| 2,877,686 | Foster | Mar. 17, 1959 |

FOREIGN PATENTS

| | | |
|---|---|---|
| 667,227 | Germany | Nov. 7, 1938 |
| 898,859 | Germany | Dec. 3, 1953 |
| 915,538 | Germany | July 22, 1954 |